Patented Jan. 3, 1950

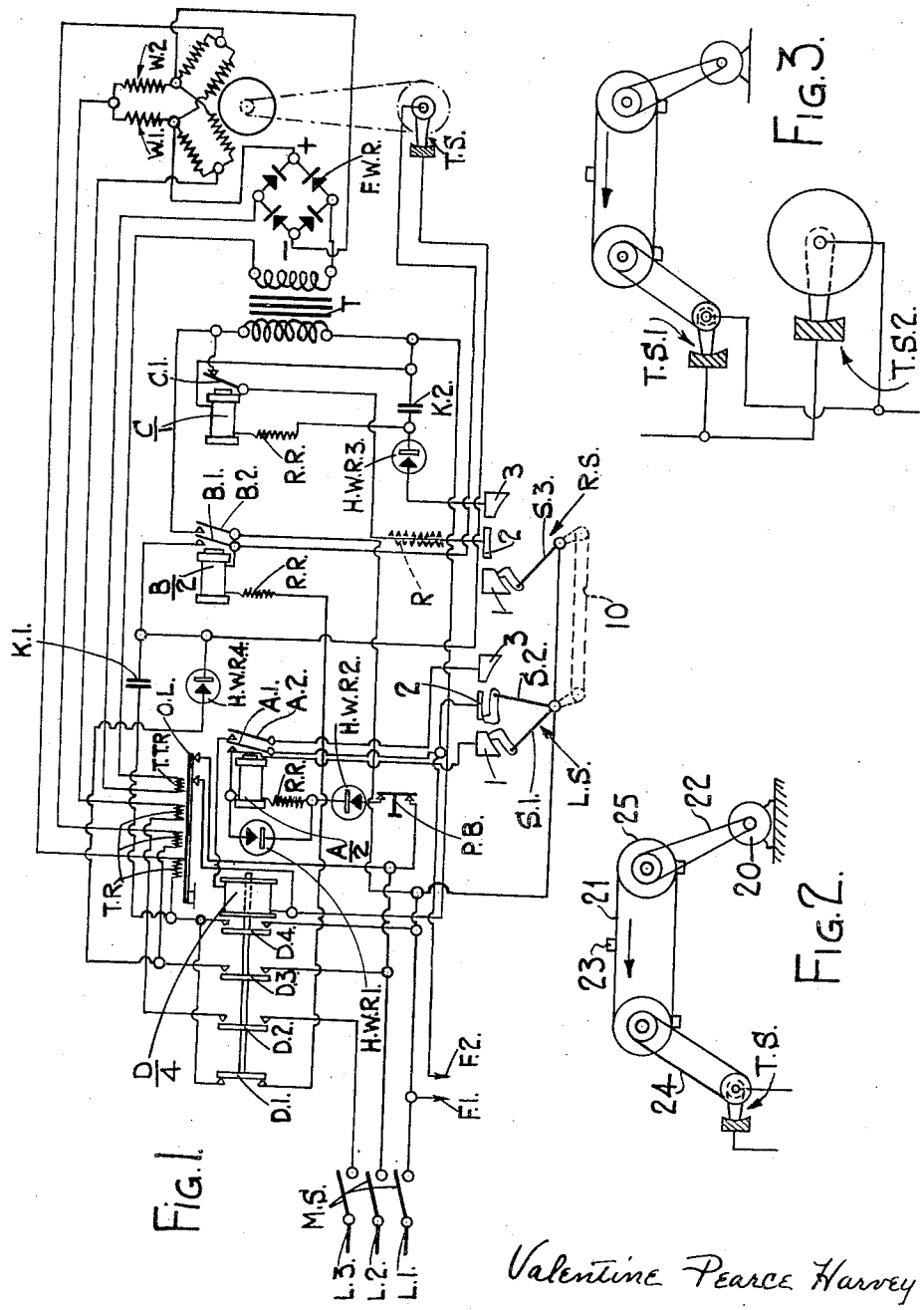

2,493,670

UNITED STATES PATENT OFFICE 2,493,670

ARRANGEMENT FOR CONTROLLING THE STARTING AND STOPPING OF MACHINES

Valentine Pearce Harvey and Gordon Francis Wellington Powell, London, England, assignors to Molins Machine Company Limited, London, England, a British company Application August 11, 1947, Serial No. 768,020 In Great Britain August 15, 1946

1 Claim. (Cl. 198—203)

This invention concerns improvements in or relating to arrangements for controlling the starting and stopping of machines (e. g. automatic machines) and in particular arrangements embodying means whereby a machine may be stopped with the parts substantially in a predetermined position.

The invention is applicable to machines comprising conveyor systems and particularly to conveyor systems where a series of articles are moved in spaced relationship with each other by a conveyor, an example of such a system being a continuous conveyor such as is commonly used on automatic packing machines. In, for example, the automatic packing of cigarettes, packets containing cigarettes are moved along a bed by an endless conveyor having pusher pieces mounted thereon at equally spaced intervals, and at some position along the conveyor path there are provided heating devices for drying the adhesive on the packets. It will be appreciated that if a conveyor of this kind is stopped when a packet is lying in contact with the heaters, the contents of the packet may be spoilt by exposure to prolonged heat, particularly as it is now the practice to use heating elements of great heat intensity. The present invention provides means whereby such a conveyor can be stopped so that the packet does not lie in such a position.

Again in such machines, finished packets are often moved into a heated box having movable walls and if the machine is stopped with the hot walls in contact with the packets the packets will be spoilt. The present invention provides means to ensure that the machine will stop with the walls of the heated box away from the packets. Numerous other examples might be cited of conditions where it is desirable that machines should be stopped with the moving parts thereof substantially in a predetermined position; for example in packing machines of the kind referred to above it might be desirable to ensure that packets do not remain in contact with adhesive applying devices for prolonged periods.

According to the invention there are provided motor control arrangements for a machine driven by an A. C. motor, comprising a manually operated switch for controlling the supply of alternating current to the motor, a source of direct current and a switch therefor, said switch being closed by movement of the machine to cause direct current to be applied to the stator winding of the motor, after the alternating current supply to the motor has been switched off by movement of said manual operated switch, to cause the motor to be dynamically braked and the machine brought to rest with the moving parts thereof substantially in a predetermined position.

The invention may be applied to a machine comprising a conveyor system conveying articles in spaced relationship with each other so that the conveyor is stopped when an article carried thereby is substantially at a predetermined position from a given point.

The circuit may comprise means for applying direct current to the stator when starting so as to reduce the starting torque and provide gentle starting for a machine which might be ill-adapted for full load torque. Means are also provided as specified later for "inching" the machine.

The invention may be used with machines which automatically stop at the end of a cycle or series of cycles and it may be used for effecting stopping at the end of such a cycle or intermediately or for both purposes.

The invention will be more fully described with reference to the accompanying drawings in which:

Figure 1 is a circuit diagram for the control of a three-phase, star-wound induction motor having twin star windings.

Figure 2 is a diagram illustrating the driving of a conveyor by the motor and the method of driving a member in timed relationship with the conveyor.

Figure 3 is a diagram illustrating the driving of a conveyor by a motor in a machine which automatically stops at the end of a cycle.

Referring to Figure 1 of the drawing, three-phase alternating current is supplied through a main switch M.S by the lines L.1—L.2 and L.3 which, when switch arms D.4—D.3 and D.2 shown beneath the line terminals are moved over to contact with said terminals, will feed alternating current to twin stator windings W.1 and W.2 of a motor which drives a conveyor as shown in Figure 2 where the motor is marked 20 and the conveyor 21. The switch arms referred to and another marked D.1 form part of a contactor D/4.

A pair of rocking switches L.S and R.S are provided and mechanically coupled as indicated by a dotted link 10 below them. Each switch has three contact blocks 1—2 and 3, and switch L.S has two contact arms S.1 and S.2 while the switch R.S has a single arm S.3. As shown both switches are in the "off" position.

Lines F.1 and F.2 lead to the detectors of the machine which may have detectors of the kind described and illustrated in the specification of United States Patent application No. 696,371. Some further description of the detectors is given later.

Direct current is applied for braking to the centre points of the twin-star windings in the manner described below. For since the centre point of each star is at the same AC potential any connection to these points cannot adversely affect the alternating current circuit as such.

When the main switch M.S. is closed the coil of a relay A/2 receives direct (rectified) current from a half-wave rectifier H.W.R.2 which is connected to the line L.2 through a press button P.B. From the relay the connection back to line L.1 is via the contact block 1 and arm S.1 of the switch L.S. The relay therefore pulls over its contact arms A.1 and A.2 to the on positions. Another half-wave rectifier H.W.R.1 is connected across the relay A/2 to prevent it from chattering when the supply from H.W.R.2 dies down at each reversal of the positive half-cycle of the alternating current.

The link 10 is moved to the left so as to bring the switch contact arm S.1 on to the contact block 2 of L.S. and the switch contact arm S.3 on to the contact block 2 of R.S. Thus current can flow from L.1 to which line the three switch arms are connected, through the arm S.3 to the block 2 of R.S and through a contact arm C.1 of a relay C/1 to the primary coil of a transformer T, the other side of the coil being joined as shown to the line L.2 through an overload release contact O.L. The secondary coil of the transformer is across a full-wave rectifier F.W.R. and from the output terminals of the rectifier, lines lead to the centres center points of the star windings W.1 and W.2 so that a direct current is set up in said windings. At the same time the movement of link 10 has brought the contact arm S.2 on to the block 3 of L.S. and thus there is a circuit for the coil of the contactor D/4 through contact A.2 to the block 3 and arm S.2 of the switch L.S. from line L.2 to the line L.1. The contactor switch arms D.1 to D.4 therefore move over to the other positions and the stator windings W.1 and W.2 are connected to the lines L.1—L.2 and L.3 and the motor starts through at a moderate speed and with a moderate starting torque because the direct current from F.W.R. still maintained in the windings has a braking effect on the rotor of the motor. To reduce this braking effect a resistance R may be included in the alternating current lead from block 2 of R.S. and this resistance may of course be adjustable for the purpose of regulation since its value is critical.

The continued movement of the link 10 brings the arm S.1 of the switch L.S. onto the block 3 of L.S. and the arm S.3 of R.S. on to the block 3 of R.S. The latter connection allows direct (rectified) current from a rectifier H.W.R.3 to pass through the coil of a relay C/1 which has a condenser K.2 connected across its terminals, the alternating supply to the rectifier being from L.1 and L.2. The contact arm C.1 is therefore pulled over and the supply to the transformer is disconnected so that the direct current in the winding W.1 and W.2 ceases and the motor runs at its full speed.

When the machine is to be stopped the link 10 is moved to the right to bring the arms S.1—S.2 and S.3 back to the position shown in Figure 1. During full-speed running the contact arm C.1 has been kept in the "off" position by direct (rectified) current from L.1 through block 3 of R.S. and H.W.R.3 to C/1 and L.2 and the arm has to be maintained in the "off" position while link 10 moves back or otherwise there would be a surge of direct current from F.W.R which would cause the motor to be braked at once when the machine might stop in any position. The current for energising the relay C/1 during this short time is obtained from the condenser K.2 which is charged during running via the rectifier H.W.R.3 and now discharges through the relay coil.

Once the contact arm S.2 leaves the block 3 of the switch L.S the coil of contactor D/4 is no longer energised and the arms D.1 to D.4 move back to the position shown in Figure 1 and the alternating current to the motor is disconnected. The arm D.1 then connects the coil of a relay B/2 to one side of a condenser K.1. This condenser is charged during running by direct (rectified) current from a rectifier H.W.R.4 which is then in series with the condenser across lines L.1 and L.2 via D.3 and D.4. From the right-hand side of the condenser the circuit is through a timing switch T.S. which is driven in synchronism with the machine as explained later with reference to Figure 2. At the moment this switch closes, the condenser discharges and energises the relay B/2. This causes its contacts B.1 and B.2 to move over to the closed positions and B.1 allows the condenser discharge to continue even though the switch T.S. may have moved on by continued movement of the machine. The closing of B.2 however feeds alternating current from L.1 to the primary coil of the transformer T. and direct current from F.W.R. flows in the winding W.1 and W.2 to provide dynamic braking for the rotor of the motor which is still moving with its momentum. It stops almost immediately and from the foregoing it will be seen that the instant of stopping is determined by the timing switch T.S. and under any given set of conditions the motor will stop at a predetermined interval after the switch T. S. makes contact.

The timing switch T.S. which as aforesaid is mechanically coupled to the conveyor constitutes the "member moving in timed relationship with the conveyor."

It will be understood from the foregoing description that the contactor D/4 is only energised as long as a contact arm of L.S. is on block 3 of the switch and that there is only a circuit for the contactor coil as long as the contact arm A2 is engaging its contact. Further it will be observed that when both the arms S.1 and S.2 are on the block 3 of L.S the circuit for the coil of the relay A/2 is through the contact A.1 and the lines F.1 and F.2 which are connected to the detector. The detectors must therefore be normally closed, that is, they open their contacts when the articles handled by the conveyor are defective so that while the machine is working satisfactorily the circuit is maintained through the detector and when a faulty article comes along, the detector contacts open and relay A/2 is disconnected. Thus for the understanding of the present invention F.1 and F.2 may be regarded as being joined together. When the detector contacts open, the contacts A.1 and A.2 open again and relay D/4 is disconnected and the machine comes to a stop in the manner described above.

While the link 10 is so manipulated as to keep the arm S.3 from moving on to the block 3, the machine may be "inched" by rocking the arm S.2 from block 2 to block 3 and back again. Each clockwise movement of the arm will start the machine, under the check of the direct current from F.W.R. and each anti-clockwise movement will stop the machine. The line from A.1 to the block 1 maintains the detector circuit short circuited while the arm S.1 is on block 1 and the line from A.1 to block 2 maintains the detector circuit short-circuited while the arm S.1 is on block 2.

As it is impossible to stop a conveyor instantaneously by this invention, the rotary switch T.S. may comprise a contact segment extending over, for example, 10° and the parts are so arranged that the direct current will be applied very soon after the time at which said segment engages the fixed contact of the rotating switch. This enables the apparatus to function satisfactorily under all conditions of weather, temperature, and time of the day, for the stopping of any machine depends on its freedom of movement which again depends on the state of the lubricant and how long the machine has been running before it is necessary to stop it. However in general the braking torque and the motor-inertia are both sufficiently great for the variations in the frictional retarding torque of the machine to have little or no effect in the very short time between the successive passage of the pusher pieces past a given point as the frictional retarding effect is very small compared with the braking torque.

Referring now to Figure 2, the motor 20 is shown positively geared to the conveyor 21, for example by a chain 22 though in practice toothed gearing is often employed. The conveyor has three pusher pieces 23 on it and it is desired that the machine shall always stop with pusher pieces substantially in the position shown. For this purpose the motor is controlled as described with reference to Figure 1 and the timing switch is driven by equal ratio gearing such as a chain 24 since the pitch circle circumference of the conveyor sprocket wheels 25 is equal to the pitch of the pusher pieces and thus one pusher piece passes a fixed point for each revolution of a conveyor sprocket wheel.

As the motor is geared to the machine a number of safety devices are incorporated in the circuit. The overload release contact O.L. breaks under abnormal currents and stops current in the contactor D/4 and the transformer T. Each arm D.2—D.3 and D.4 is joined to the stator leads by a thermal release T.R which also breaks the circuit through O.L. if abnormal currents occur. A similar thermal-release T.T.R. on the output side of the transformer also causes O.L. to operate. Each relay A/2—B/2 and C/1 has a resistance R.R. in series with it because these relays (a commercial product) have not sufficient resistance for the high voltages involved.

The press-button P.B. may be regarded as typical of several placed at different positions about the machine for emergency stopping. Its operation breaks the circuit of A/2 and thus D/4 is disconnected.

In the normal operation of the machine the link 10 is rocked backwards rapidly, for stopping, and to and fro for crawling and inching which are only done from rest. Thus all intentional stops bring the machine to rest with the parts in the desired position. Stopping by the operation of O.L., T.R, T.T.R or the press button P.B. represents abnormal stops, and it is not then material where the machine stops, since these stops are very infrequent.

For the safety of the operators the guards used on a machine are often coupled to the circuit, so that a machine cannot be driven if a guard is displaced, and the button P.B. may be regarded as the equivalent of a guard interposed in the circuit. Any of these abnormal stops, including those due to the displacements of guards, require that the link 10 shall be first moved to its initial or stop position before the machine can be restarted.

In the case of machines operating in cycles and stopping at the end of a cycle the timing switch T.S may be suitably geared to stop the machine at the end of a given cycle or sequence of operations or where it is desired to use it to ensure that whenever the machine is stopped, even in the middle of such a given cycle, the machine will stop with a part in a definite position, another timing switch suitably geared may be used to stop the machine at the end of said cycle. This is illustrated in Figure 3 of the drawings where T.S.1 is the special timing switch and T.S.2 is the cycle timing switch. As shown T.S.2 is driven by 1 to 3 reduction gearing and so the conveyor will stop each time a given pusher has passed completely along the conveyor path while T.S.2 is geared as in Figure 2 of the drawings and makes contact for each pusher piece passing a given point. It is assumed that in this case the rod 10 is automatically operated at the end of a cycle which is easily done by providing a tappet, trigger or the like actuated by a moving part of the machine while other stops are effected by manual operation of the rod as before.

What we claim as our invention and desire to secure by Letters Patent is:

Motor control arrangements for a machine having a conveyor system conveying articles in spaced relationship and driven by an A. C. motor, comprising a manually operated switch for controlling the supply of alternating current to the motor, a source of direct current, a circuit for applying current from said source to the stator winding of the motor, and a switch for controlling said circuit, means operable by movement of the machine to close said last named switch and to cause direct current to be applied to the said stator winding of the motor, and devices rendering said means operative to close said last named switch only after the alternating current supply to the motor has been switched off by movement of said manually operated switch, to cause the motor to be dynamically braked and the machine brought to rest with an article carried by the conveyor substantially at a predetermined position from a given point.

VALENTINE PEARCE HARVEY.
GORDON FRANCIS WELLINGTON POWELL.

REFERENCES CITED

The following references are of record in the file of this patent:

UNITED STATES PATENTS

| Number | Name | Date |
|---|---|---|
| 1,815,571 | Kimball | July 21, 1931 |
| 1,997,464 | Krebs | Apr. 9, 1935 |
| 2,005,663 | Phily | June 18, 1935 |
| 2,229,414 | King | Jan. 21, 1941 |
| 2,285,517 | Harvey et al. | June 9, 1942 |
| 2,340,174 | Chance | Jan. 25, 1944 |
| 2,461,919 | Powell | Feb. 15, 1949 |